United States Patent
Shivakumar et al.

(10) Patent No.: US 12,307,119 B1
(45) Date of Patent: May 20, 2025

(54) DATA STORAGE DEVICE AND METHOD FOR MULTIPLE META DIE BALANCING

(71) Applicant: Western Digital Technologies, Inc., San Jose, CA (US)

(72) Inventors: Sharath Shivakumar, Bangalore (IN); Amit Sharma, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/387,162

(22) Filed: Nov. 6, 2023

(51) Int. Cl.
*G06F 3/00* (2006.01)
*G06F 3/06* (2006.01)
*G06F 12/02* (2006.01)

(52) U.S. Cl.
CPC .......... *G06F 3/0647* (2013.01); *G06F 3/0604* (2013.01); *G06F 3/064* (2013.01); *G06F 3/0679* (2013.01); *G06F 12/023* (2013.01); *G06F 12/0253* (2013.01); *G06F 2212/702* (2013.01); *G06F 2212/7205* (2013.01); *G06F 2212/7211* (2013.01)

(58) Field of Classification Search
CPC ....... G06F 2212/702; G06F 2212/7205; G06F 2212/7211; G06F 12/0253; G06F 12/023; G06F 3/0647; G06F 3/0604; G06F 3/064
See application file for complete search history.

(56) References Cited

U.S. PATENT DOCUMENTS

| | | | |
|---|---|---|---|
| 9,778,855 B2 | 10/2017 | Sinclair | |
| 11,249,903 B2 | 2/2022 | Byun | |
| 11,556,249 B2 | 1/2023 | Gunda | |
| 2021/0342263 A1 | 11/2021 | He et al. | |
| 2022/0066648 A1* | 3/2022 | Gunda | ................ G11C 11/5635 |

FOREIGN PATENT DOCUMENTS

KR   10-2076248 B1   2/2020

* cited by examiner

*Primary Examiner* — Reginald G Bragdon
*Assistant Examiner* — Michael L Westbrook
(74) *Attorney, Agent, or Firm* — Crowell & Moring LLP (57) ABSTRACT

A host can write data to and/or read data from a memory in a data storage device. In addition to writing host data in the memory, the data storage device can perform internal data movement/relocation (e.g. for wear leveling). The data storage device and method provided herein can balance host writes and relocation operations in multiple meta die systems by reducing the number of open blocks across the system.

17 Claims, 11 Drawing Sheets

DATA STORAGE DEVICE AND METHOD FOR MULTIPLE META DIE BALANCING

BACKGROUND

A host can write data to and/or read data from a memory in a data storage device. In addition to writing host data in the memory, the data storage device can perform internal data movement/relocation (e.g. for wear leveling).

DETAILED DESCRIPTION

The following embodiments generally relate to a data storage device and method for multiple meta die balancing. In one embodiment, a data storage device is provided comprising a plurality of memory dies organized into a plurality of meta dies, wherein each meta die comprises a subset of the plurality of memory dies that can operate in parallel. The data storage device also comprises one or more processors, individually or in combination, configured to: determine a ratio of host writes and relocation operations to be performed in host and relocation blocks in one of the plurality of meta dies; based on a state of the data storage device, determine whether closures of the host and relocation blocks can be aligned; in response to determining that the closures of the host and relocation blocks can be aligned, perform the relocation operations; and in response to determining that the closures of the host and relocation blocks cannot be aligned, delay the relocation operations to align the closures of the host and relocation blocks.

In another embodiment, a method is provided that is performed in a data storage device comprising a plurality of memory dies organized into a plurality of meta dies, wherein each meta die comprises a subset of the plurality of memory dies that can operate in parallel. The method comprises: determining host writes and relocation operations to be performed in host and relocation blocks in one of the plurality of meta dies; determining a schedule to perform the host writes and relocation operations to align closures of the host and relocation blocks; and performing the host writes and relocation operations based on the schedule.

In yet another embodiment, a data storage device is provided comprising: a plurality of memory dies organized into a plurality of meta dies, wherein each meta die comprises a subset of the plurality of memory dies that can operate in parallel; means for determining a ratio of host writes and relocation operations to be performed in host and relocation blocks in one of the plurality of meta dies; means for determining, based on a state of the data storage device, whether closures of the host and relocation blocks can be aligned; means for performing the relocation operations in response to determining that the closures of the host and relocation blocks can be aligned; and means for delaying the relocation operations to align the closures of the host and relocation blocks in response to determining that the closures of the host and relocation blocks cannot be aligned.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
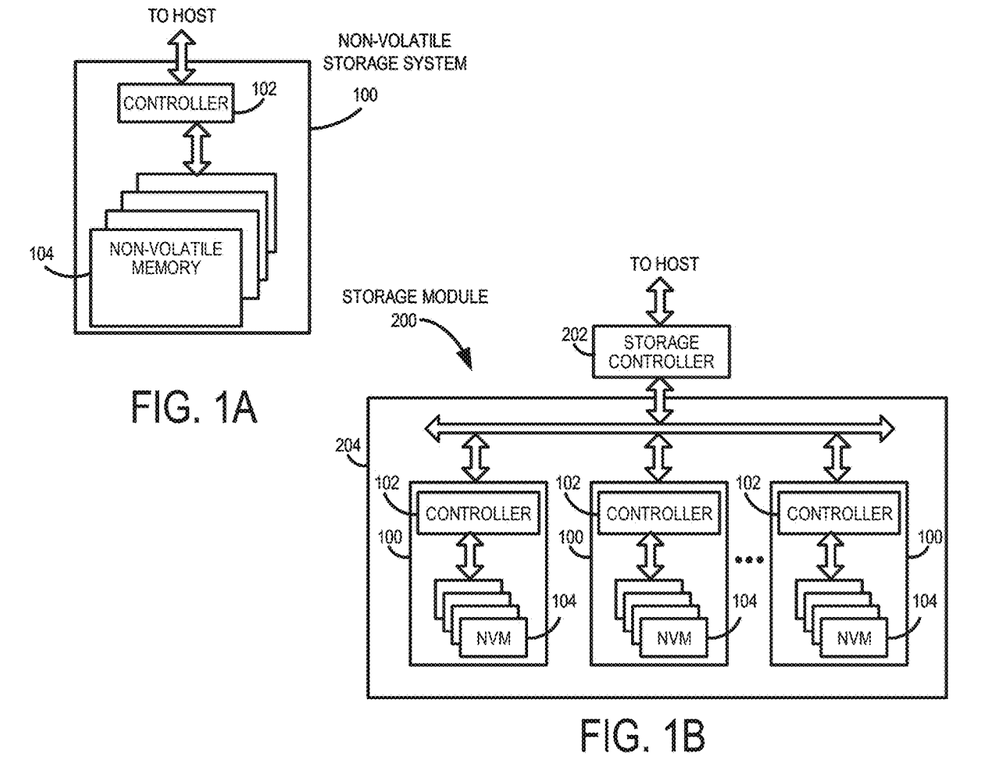
FIG. 1A is a block diagram of a data storage device of an embodiment.
FIG. 1B is a block diagram illustrating a storage module of an embodiment.
Figure 1C:
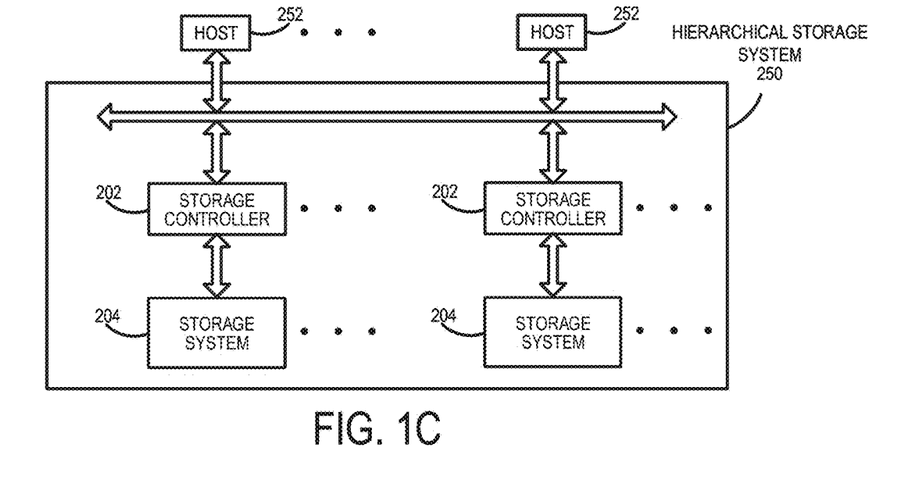
FIG. 1C is a block diagram illustrating a hierarchical storage system of an embodiment.

Examples of data storage devices suitable for use in implementing aspects of these embodiments are shown in FIGS. 1A-IC. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
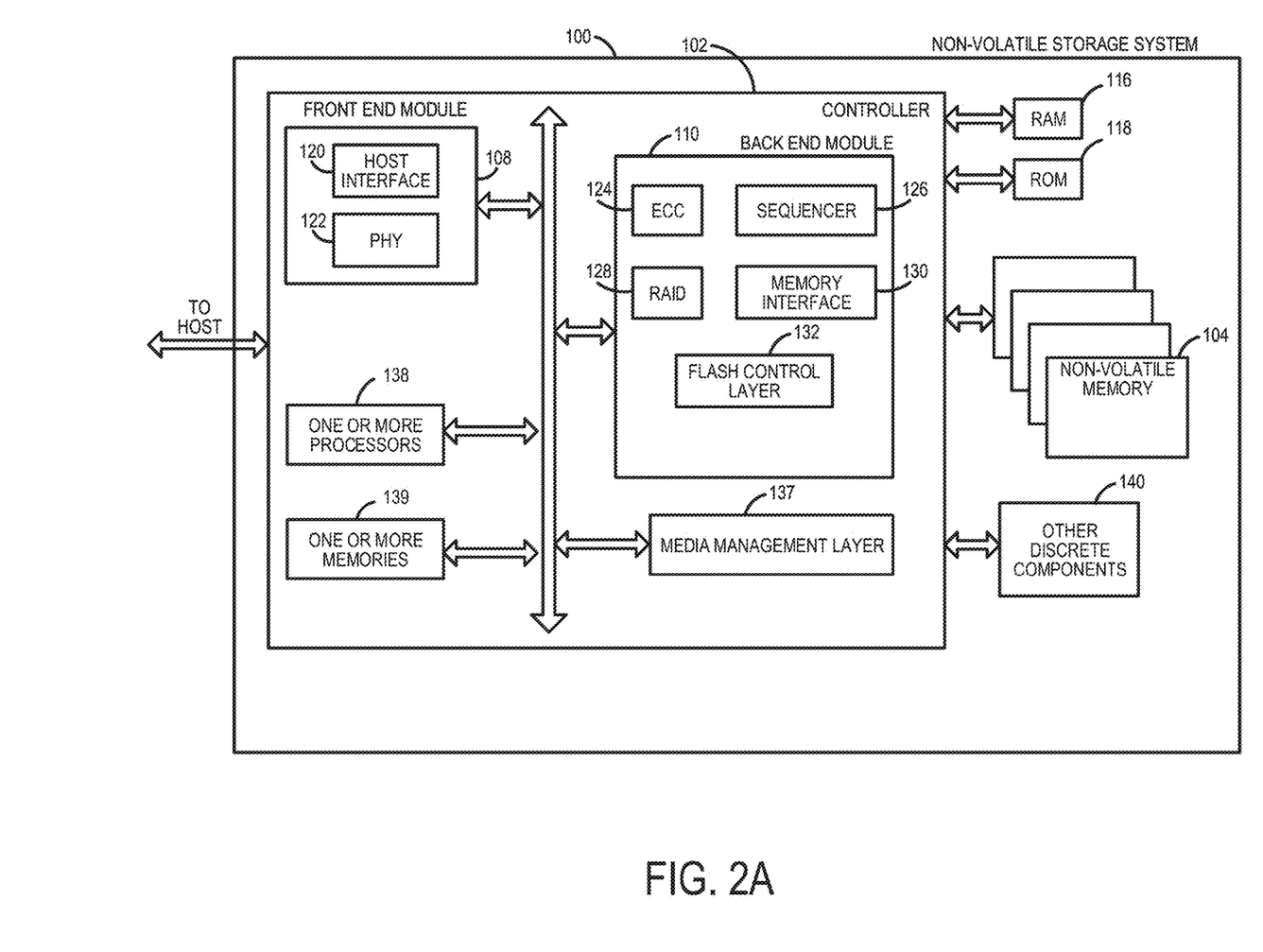
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
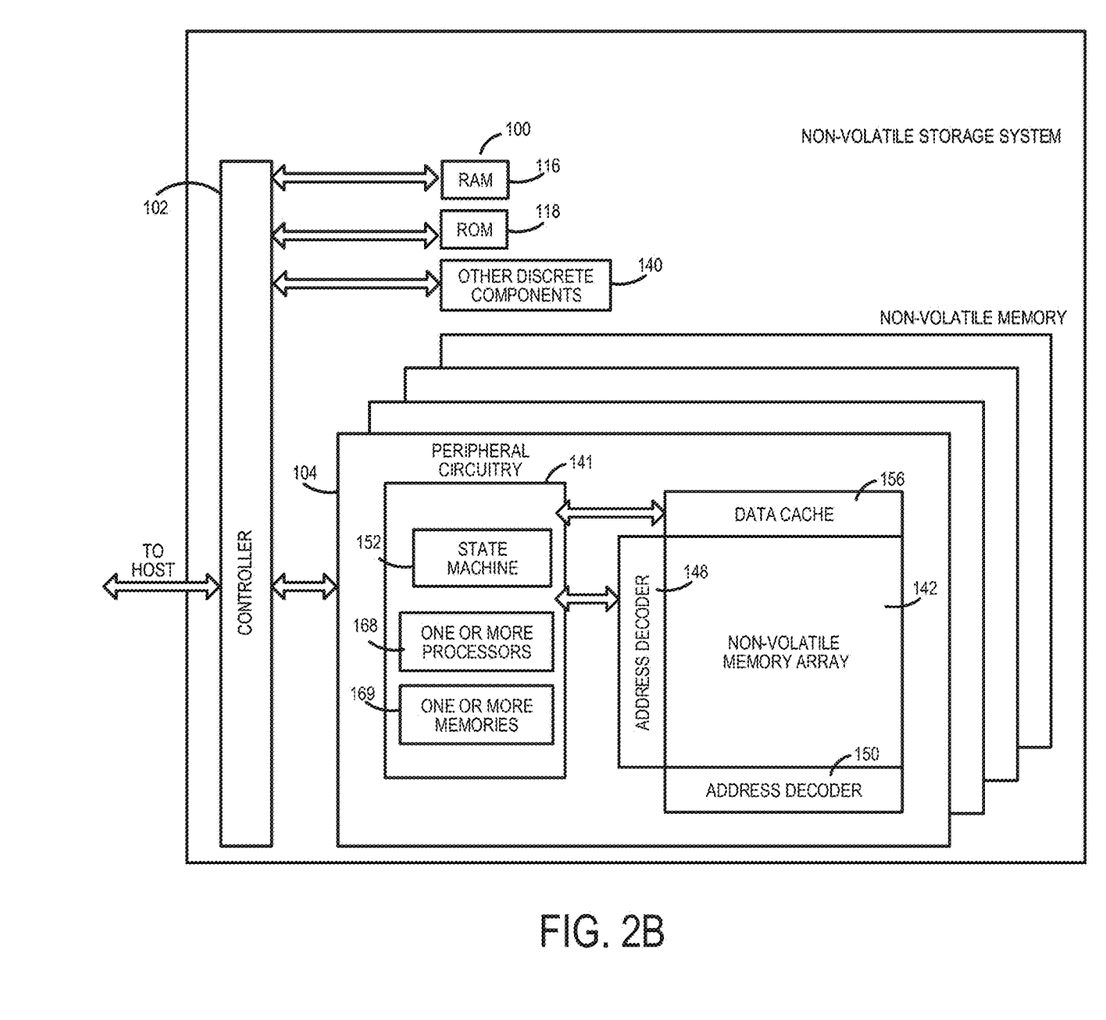
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
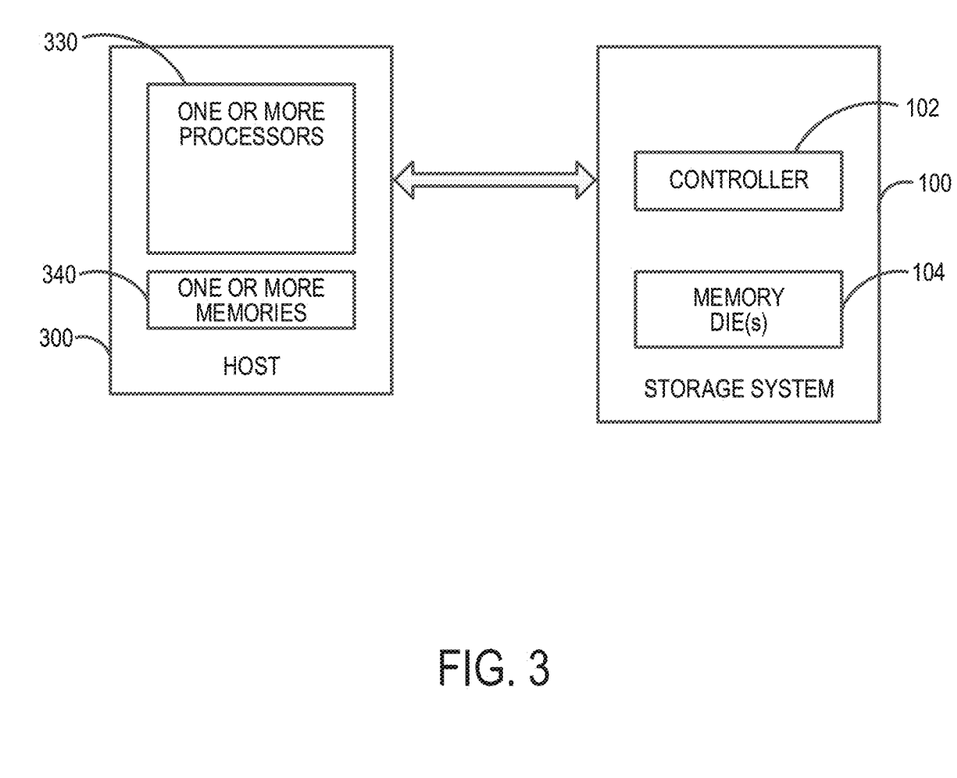
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The data storage device 100 can perform internal data movement/relocation, such as, but not limited to, movement from a single level cell (SLC) block to a multi-level cell block (MLC), from an MLC block to an SLC block, and from one MLC block to another MLC block (e.g., for wear leveling when cold data is not to be mixed with other data). All these relocations could happen simultaneously.

The data storage device 100 may wish to balance host write and relocation operations. For example, depending on how much relocation needs to be performed, a ratio between host writes and relocation operations can be calculated, and the ratio can be used to execute host and relocation operations accordingly. When relocation operations are in progress, the host 300 may encounter reduced device speed. Balancing the performance of some steps of relocation and some steps of host writes can help ensure a smoother host experience. Even though the host 300 may encounter a reduction in device speed, this reduction can be made smooth/consistent and not erratically drop. The ratio can be used to ensure that the host 300 does not get throttled a lot or, in the worst case, time out.

Additionally, open memory blocks (i.e., blocks that are not fully programmed) can be more prone to error. As such, these blocks may encounter a severe data retention problem. However, it may be preferred to have a minimum number of blocks open at any point of time. Open blocks can lead to more data movement (e.g., in case the data in blocks is about to go bad) or even complete data loss. This severity of this problem can increase as the memory 104 stores more bits per cells (e.g., four bits per cell, five bits per cells, etc.)

Further, there is an increased demand of higher-capacity storage products (e.g., 4 TB, 8 TB, etc.). These types of products have a greater number of dies, but not all dies can be operated in parallel due to power reasons. As such, multiple meta dies can be used. A "meta die" refers to a grouping of a number (e.g., the maximum number) of memory dies that can operate in parallel. For example, in a 64 memory die system, 16 memory dies can be grouped together. In this case, the data storage device 100 would have four meta dies. Each meta die is more of an independent sub system and can have its own logical-to-physical address table blocks (e.g., global address table (GAT) blocks), host blocks, relocation blocks, etc.

Figure 4:
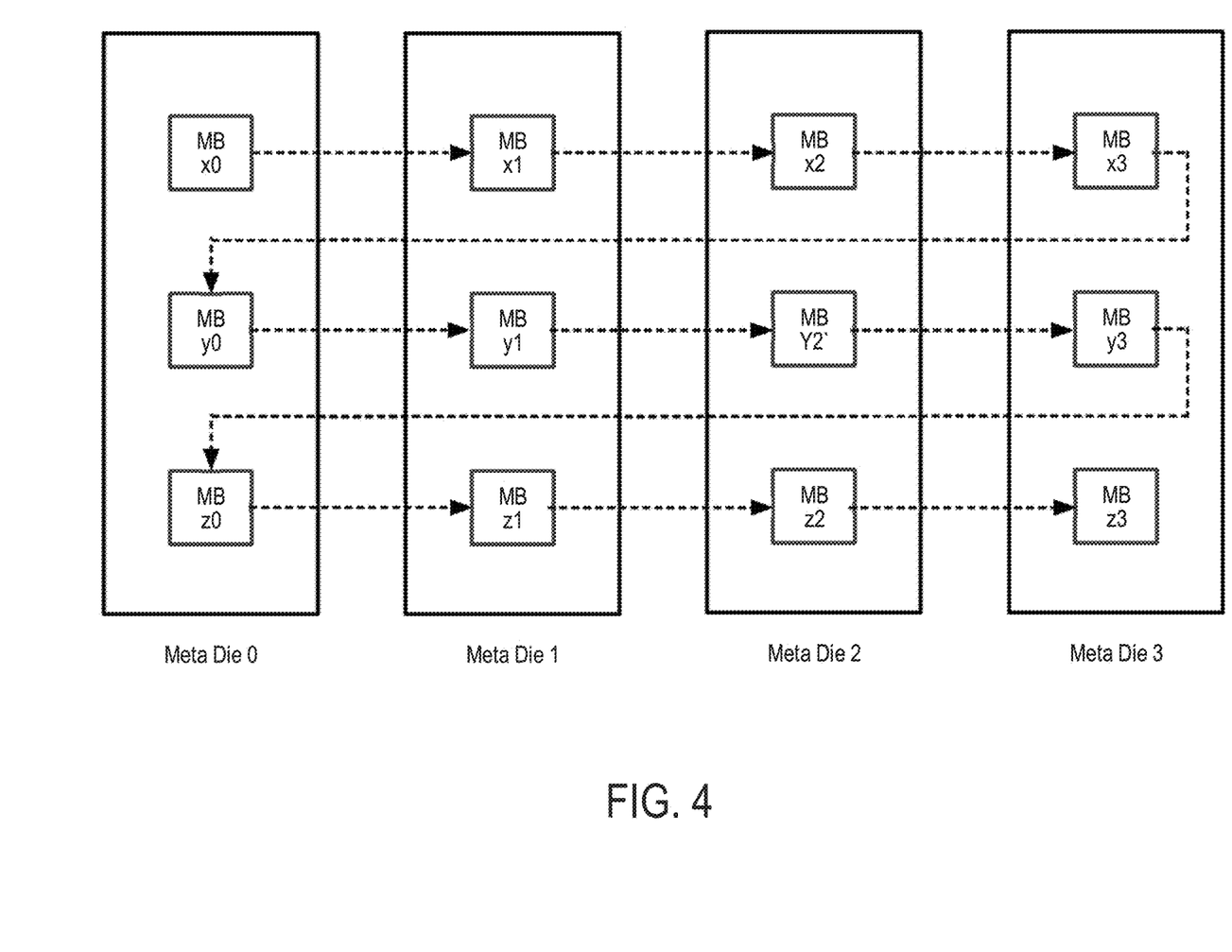
FIG. 4 is an illustration of meta die switching at block boundaries of an embodiment.

Higher-capacity data storage devices have multiple meta dies, and each meta die has its own set of open blocks. As all meta dies have to be used equally to ensure uniform usage of all the memory blocks, meta die switching can happen at every closure of a host block. FIG. 4 illustrates meta die switching at block boundaries.

As mentioned above, each meta die can have its own set up host blocks, GAT blocks, relocation blocks, etc. If there are eight meta dies and each meta die has three types of relocations, without any predictable scheme, as many as 24 relocation destination blocks could be open. Having too many open blocks in higher-capacity multi meta dies (e.g., storing three or four bits per cell) can pose several challenges, such as increased write amplification, where more scrubbing operations would take more program-erase cycles (PECs), thereby increasing write amplification of the data storage device 100. Another challenge is the probability of a host timeout. For example, assume the data storage device 100 is powered after a long time, and there are multiple open blocks that would have data retention issues and data that needs to be moved. If there is not enough time available to move the data out, host operations may need to be heavily throttled, which could lead to command timeouts.

Another challenge is the increased risk of data loss (e.g., in a worst-case scenario, data can become unrecoverable leading to data loss). Yet another challenge is reduced performance. As data in open blocks is prone to more errors, the data in these blocks needs to be scrubbed (moved) to newer locations (assuming the data storage device 100 can detect that the data is about to go bad in time). This means having more internal operations that need to be performed with host operations, which can reduce host speed. It should be noted that in single meta die systems, this problem has less impact, as each relocation type has only one open block per relocation type.

Existing balancing schemes cannot ensure that the ongoing host write block and relocation (RLC) destination block are completed together due to various limitations of these schemes. The following embodiments provide methodologies that can minimize the relocation open blocks by balancing host writes with relocation operations without erratically throttling the host 300.

In general, these embodiments align the relocation block closure with the host block closure. While doing so, these embodiments consider the system state and then ensure that the host 300 does not encounter erratic low speed from the data storage device 100 or, in the worst case, host command timeouts. In some embodiments of a multi meta die system, the meta die is switched at a host block boundary. If the system can ensure that relocation blocks also get closed with the host block, the number of open blocks in the system would decrease. These embodiments find scenarios based on system state and then either delay, accept, or prioritize relocation. As an additional mechanism, the meta die switch during write can be delayed ensuring that host block and RLC destinations are closed together. It should be noted that relocation that is too aggressive not only could reduce host speed erratically (low quality of service (Qos)) but could also lead to time outs.

Typical relocation balancing in a single meta die system need not to worry about aligning host and relocation block closure. But in multiple meta dies, these embodiments can start or delay relocation only when the data storage device 100 can ensure that relocation blocks would get closed with a host block without impacting the host experience. To simplify the following discussion, in the following examples, only one relocation type is depicted. In other implementation, there can be multiple types of relocations, all of which can be operational at the same point. The same logical concepts provided below can be applied to other relocation types.

Figure 5:
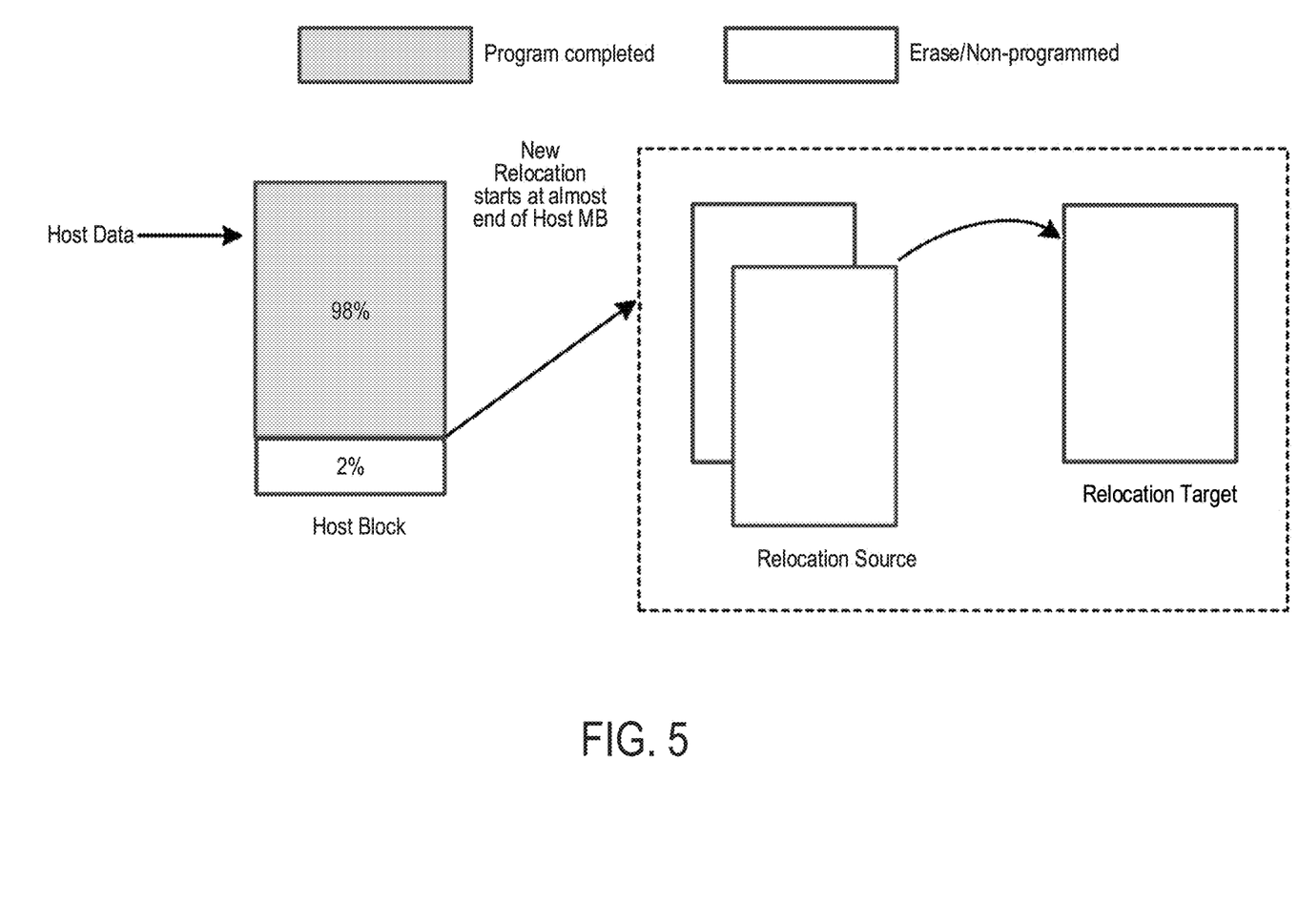
FIG. 5 is an illustration of a relocation of an embodiment.

A "brute force" attempt to close host and relocation blocks at same time can have an impact. For example, if the data storage device 100 attempts to blindly align host block completions to relocation block closures, this could lead to a large drop in device speed (as less host data gets written and more relocation operations need to be done) or in, the worst case, could lead to timeouts. FIG. 5 illustrates this issue. As shown in FIG. 5, there is only 2% space left in the host block 500 to align closure of the host and relocation blocks, but the relocation block closure should happen within this 2% space. In other words, for every one step of host write, 50 steps of relocation would happen, which can result in a low host speed.

As seen from the above, the "brute force" alignment of relocation operation balancing can lead to low quality of service or host command timeouts. In one embodiment, a new relocation is started by investigating one or more system factors and calculating a ratio between host writes (HostWrite) and relocation (RLC) writes in such a way that HostBlock closure and RLC block closure are done together. Any suitable factor(s) can be used. For example, one factor can be the number of free blocks present in the active partition. If the host block has already been largely written (almost full) and then a new relocation starts, it could lead to low quality of service or a write timeout. So, this embodiment checks the number of free blocks and, if the number of free blocks is not below a threshold (e.g., an urgent mode threshold), the current relocation can be delayed until the current host block write is complete. If the number is below a threshold, relocation may not be delayed as this may lead to a read-only (RO) mode due to a no-block scenario. In this case, the relocation can be immediately started, but the meta die switch can be delayed until the next host block is completely written. A balancing module in the data storage device 100 can calculate the ratio based on the scenario and ensure that the relocation is spread across the current host block and the next host block.

Another example factor is command timeouts. The data storage device 100 can predict the ratio of host and relocation operations before starting the relocation. If they lead to a timeout, the relocation can be delayed until the next host block write in this meta die. Yet another example factor is provisioning to stay in the same meta die. If meta block closure cannot be ensured, the data storage device 100 can delay the meta die switch. Typically, in multi meta dies, the host writes can select different meta dies after writing a block. This can be delayed, and a second meta block can be selected in same meta die. As yet another example, the data storage device 100 can consider aligning a host block closure and an RLC destination closure. Once the decision is made to start a relocation, a balancing module in the data storage device 100 can calculate the ratio of host and relocation operations in such a way to close both blocks at same time.

The following paragraphs provide several examples of these concepts. It should be understood that these are merely examples and that other implementations can be used. As such, the details provided herein should not be read into the claims unless expressly recited therein.

Figure 6:
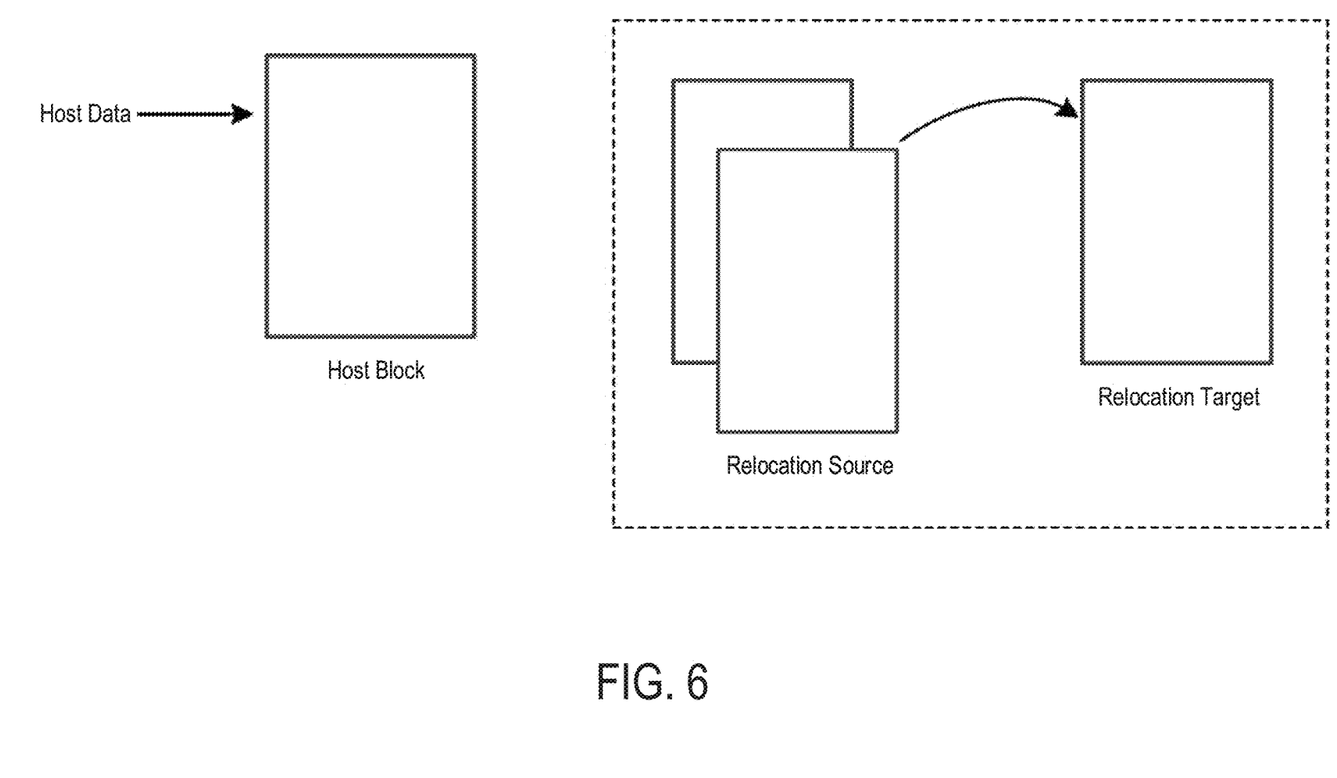
FIG. 6 is an illustration of an embodiment where a relocation and a host write starts at a same time.

One example (see FIG. 6) is a relatively-simple situation where relocation and host writes start at same time. When programming a new host block starts, the data storage device 100 determines an amount of relocation pending and determines a ratio of the number of host steps to finish programming both host and relocation target blocks at the same time. This example is a simple use case (much like a single meta die solution), where a new relocation needs to be performed when a new host block is opened. Here, the ratio of host writes and relocation operations is selected in a way that both the host block and the relocation block get closed at same time.

Figure 7:
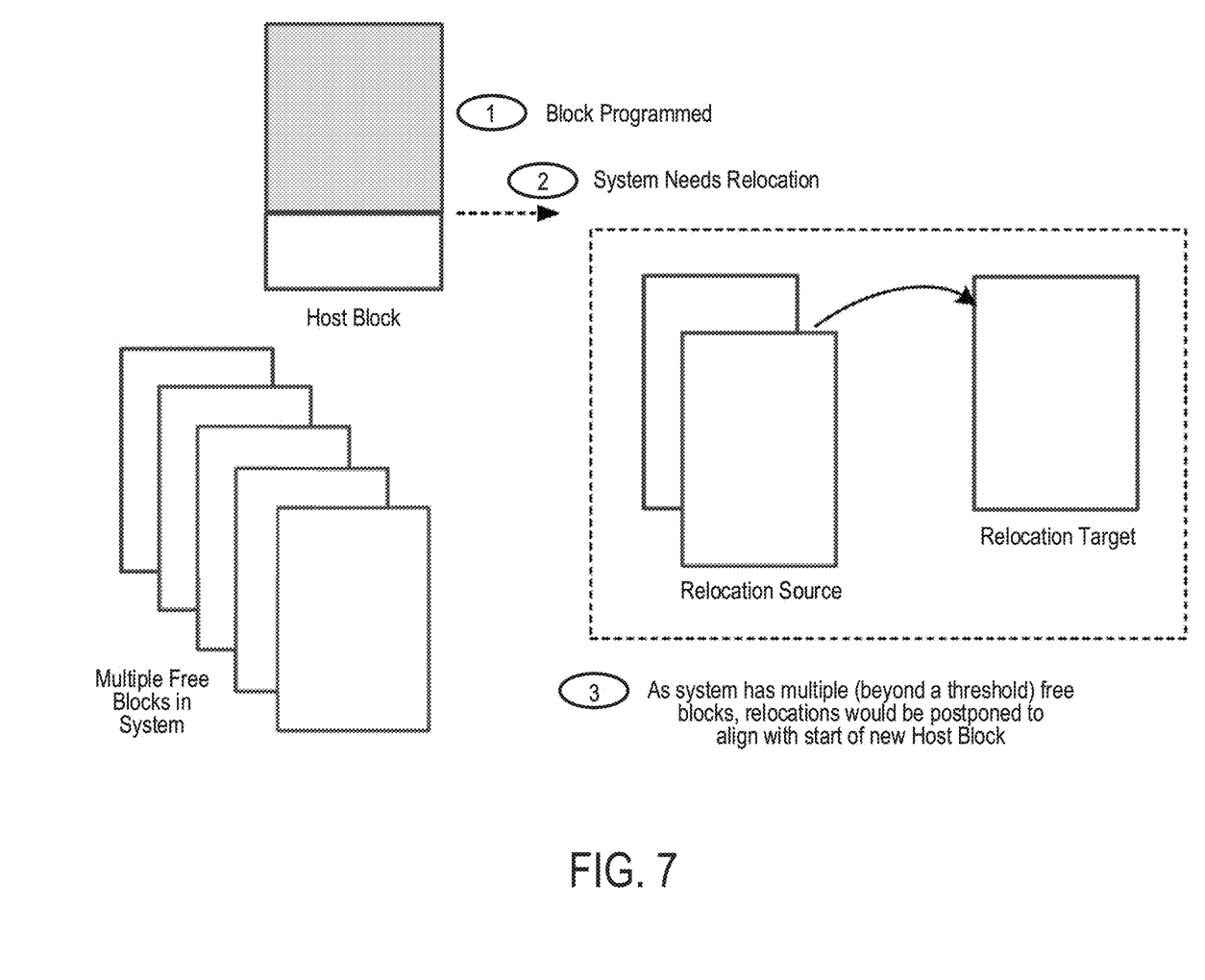
FIG. 7 is an illustration of an embodiment where relocation is delayed.

In another example (see FIG. 7), relocation is delayed. As shown in FIG. 7, the host block is programmed, and the system need relocation. As the system has multiple (e.g., beyond a threshold) free blocks, relocations can be proposed to align with the start of a new host block. In this example, relocation is required when the host block is 75% filled. Here, the host block only has 25% space to be programmed. If relocation operation were to start here, the host 300 would be throttled to a higher level, which would result in a low quality of service. Moreover, an even-more-severe case would be where the host block is filled 99%, in which case starting a relocation operation could lead to a timeout. So, the data storage device 100 can investigate the possibility of delaying the relocation to next host block. In this example, multiple free blocks are available; hence, the relocation can be delayed.

Figure 8:
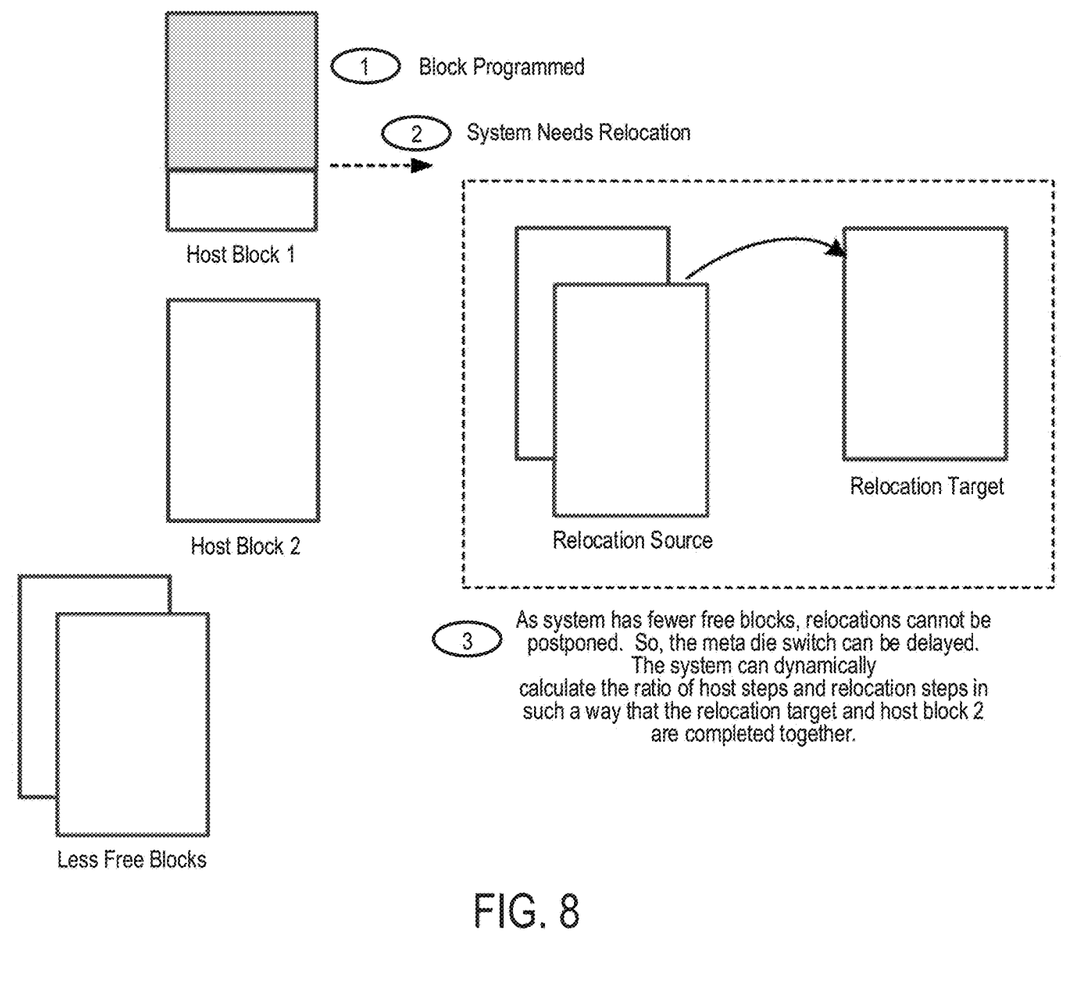
FIG. 8 is an illustration of an embodiment where meta die switching is delayed.

Another example (see FIG. 8) relates to delaying meta die switching. In this example, the host block is programmed, and the system need relocation. As system has fewer free blocks, relocations cannot be postponed. So, the meta die switch can be delayed. The system can dynamically calculate the ratio of host steps and relocation steps in such a way that the relocation target and host block 2 are completed together. Here, there are fewer free blocks; hence, relocation is mandatory. The system can further investigate, with the host, if attempting relocation could lead to a timeout. To avoid a timeout, the system can pick this relocation instead of completing the RLC. By the end of current host block, meta die switching is delayed (the next host block is opened in the same meta die), and the relocation is balanced in such a way that it is spread across this host block and next host block. So, it is always guaranteed with this scheme that the meta die switch is done when both HostBlock and RLC destinations are complete.

Figure 9:
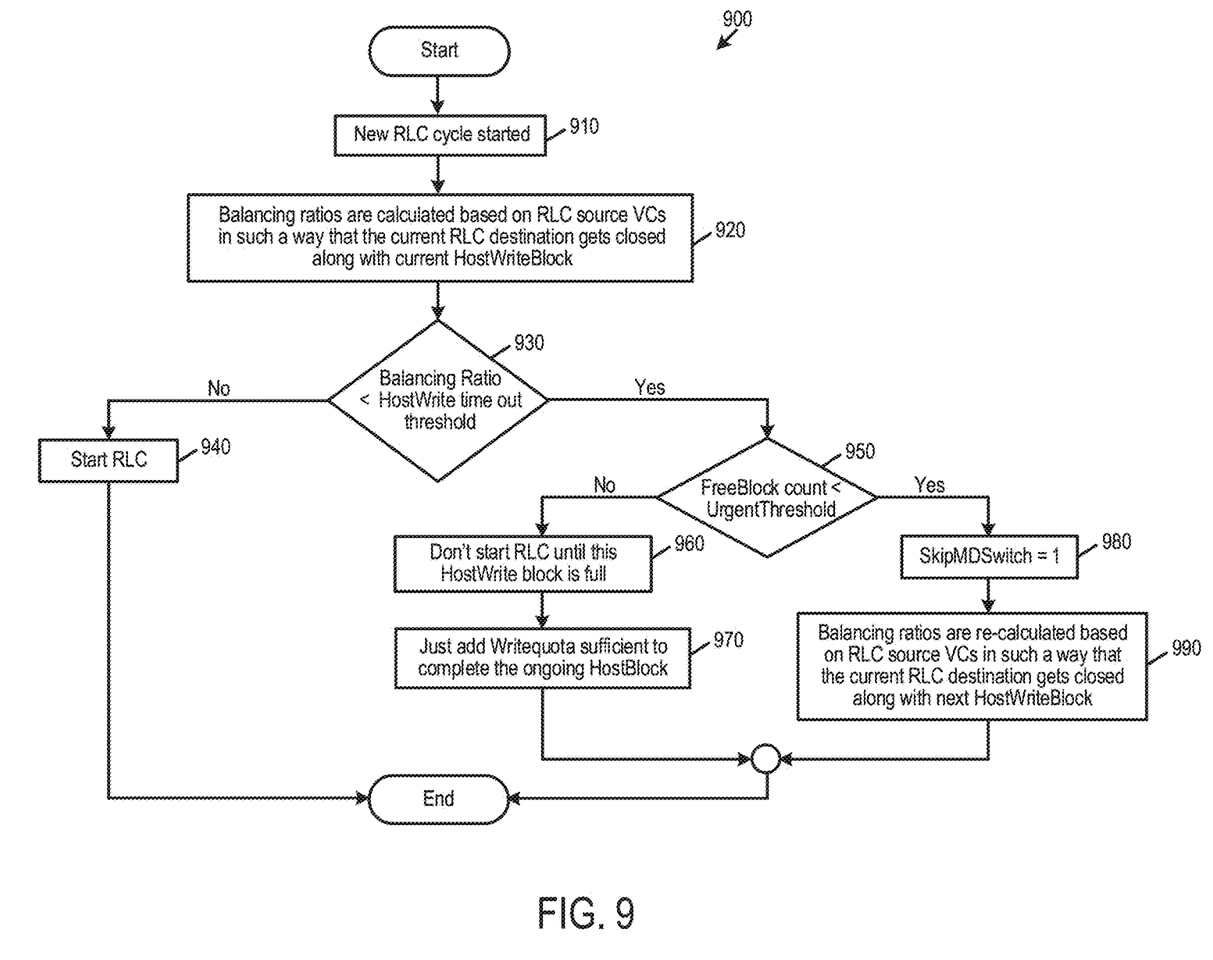
FIG. 9 is a flow chart of a balancing flow method of an embodiment.

Turning again to the drawings. FIG. 9 is a flow chart 900 of a balancing flow method of an embodiment. As shown in FIG. 9, after a new RLC cycle has started (act 910), balancing ratios are calculated based on RLC source valid counts (VCs) in such a way that the current RLC destination gets closed along with the current HostWriteBlock (act 920). The data storage device 100 then determines whether the balancing ratio is less than the HostWrite time-out threshold (act 930). If the balancing ratio is not less than the HostWrite time-out threshold, the data storage device 100 starts the RLC process (act 940). However, if the balancing ratio is greater the HostWrite time-out threshold, the data storage device 100 determines whether the FreeBlock count is less than the UrgentThreshold (act 95). If the FreeBlock count is not less than the UrgentThreshold, the data storage device 100 does not start the RLC until the HostWrite block is full (act 960) and adds a Writequota sufficient to complete the ongoing HostBlock (act 970). However, if the FreeBlock count is less than the UrgentThreshold, the data storage device 100 sets the SkipMDSwitch variable to one (act 980) and re-calculates the balancing ratios based on the RLC source VCs in such a way that the current RLC destination gets closed along with the next HostWriteBlock (act 990).

Figure 10:
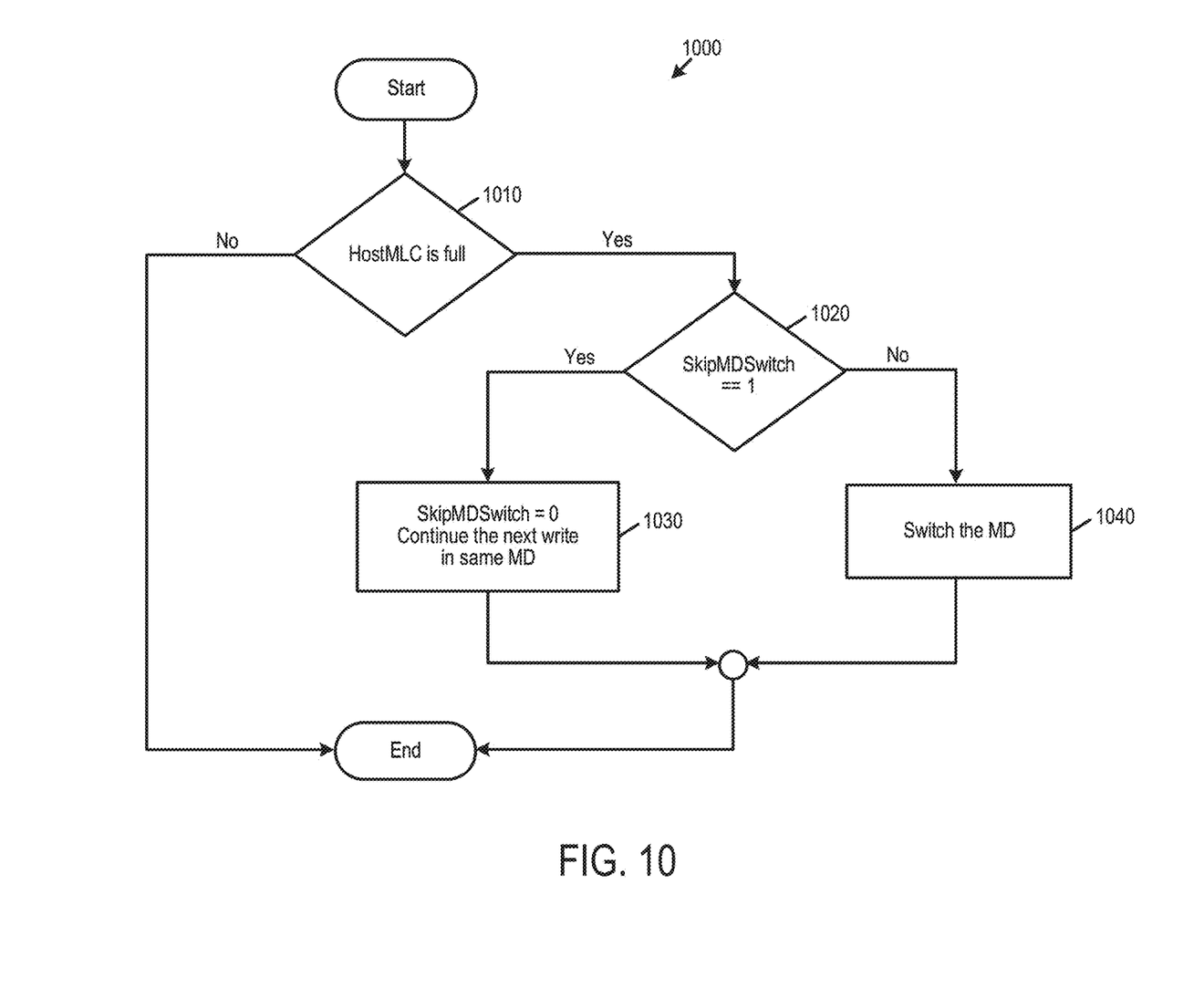
FIG. 10 is a flow chart of a meta die switch method of an embodiment.

FIG. 10 is a flow chart 1000 of a meta die switch method of an embodiment. As shown in FIG. 10, the data storage device 100 determines if the HostMLC is full (act 1010). If the HostMLC is not full, the method ends. If the HostMLC is full, the data storage device 100 determines if SkipMDSwitch equals one (act 1020). If SkipMDSwitch equals one, SkipMDSwitch is set to zero, and the data storage device 100 continues to the next write in the same meta die (act 1030). However, if SkipMDSwitch does not equal one, the data storage device 100 switches the meta die (act 1040).

In summary, the above-described embodiments can be used to minimize the number of open relocation blocks in a multi meta die environment without impacting quality of service. In general, storage produces are moving towards higher capacities, and these embodiments can provide more benefits as capacity increases, as shown by the below chart:

|  | 4 TB Capcity | | 8 TB Capacity | |
|---|---|---|---|---|
|  | Existing | With Proposal | Existing | With Proposal |
| Num of Open Blocks | 6 | 3 | 12 | 3 |
| Data At Data Retention Risk | 13.8 GB | 6.9 GB | 27.6 GB | 6.9 GB |

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a plurality of memory dies organized into a plurality of meta dies, wherein each meta die comprises a subset of the plurality of memory dies that can operate in parallel; and
   one or more processors, individually or in combination, configured to:
      determine a ratio of host writes to relocation operations to be performed in host and relocation blocks in one of the plurality of meta dies;
      based on a state of the data storage device, determine whether closures of the host and relocation blocks can be aligned;
      in response to determining that the closures of the host and relocation blocks can be aligned, perform the relocation operations; and in response to determining that the closures of the host and relocation blocks cannot be aligned, delay the relocation operations to align the closures of the host and relocation blocks.

2. The data storage device of claim 1, wherein the one or more processors, individually or in combination, are further configured to prioritize the relocation operations.

3. The data storage device of claim 1, wherein the state of the data storage device comprises a number of free blocks present in an active partition.

4. The data storage device of claim 1, wherein the state of the data storage device comprises a status of a command time-out requirement.

5. The data storage device of claim 1, wherein the one or more processors, individually or in combination, are further configured to delay switching to another one of the plurality of meta dies for a next host write until after the host and relocation blocks are closed together.

6. The data storage device of claim 1, wherein the relocation operations move data from a single-level cell (SLC) block to a multi-level cell (MLC) block.

7. The data storage device of claim 1, wherein the relocation operations move data from one multi-level cell (MLC) block to another MLC block.

8. The data storage device of claim 1, wherein the plurality of memory dies comprise respective three-dimensional memory arrays.

9. In a data storage device comprising a plurality of memory dies organized into a plurality of meta dies, wherein each meta die comprises a subset of the plurality of memory dies that can operate in parallel, a method comprising:
   determining a ratio of host writes to relocation operations to be performed in host and relocation blocks in one of the plurality of meta dies;
   determining, based on a state of the data storage device, whether closures of the host and relocation blocks can be aligned;
   performing the relocation operations in response to determining that the closures of the host and relocation blocks can be aligned; and
   delaying the relocation operations to align the closures of the host and relocation blocks in response to determining that the closures of the host and relocation blocks cannot be aligned.

10. The method of claim 9, further comprising:
    determining whether a number of free blocks present in an active partition in one of the plurality of meta die is below a threshold; and
    in response to determining that the number of free blocks in the active partition is not below the threshold, delaying the relocation operations until a current host block write is complete.

11. The method of claim 10, further comprising:
    in response to determining that the number of free blocks is below the threshold, performing the relocation operations but delaying a switch to another one of the plurality of meta dies until a next host block is completely written.

12. The method of claim 11, further comprising:
    spreading the relocation operations across a current host block and the next host block.

13. The method of claim 9, further comprising:
    delaying switching from one of the plurality of meta dies to another one of the plurality of meta dies for a next host write until after the host and relocation blocks are closed together.

14. The method of claim 9, wherein the relocation operations move data from a single-level cell (SLC) block to a multi-level cell (MLC) block.

15. The method of claim 9, wherein the relocation operations move data from one multi-level cell (MLC) block to another MLC block.

16. The method of claim 9, wherein the plurality of memory dies comprise respective three-dimensional memory arrays.

17. A data storage device comprising:
    a plurality of memory dies organized into a plurality of meta dies, wherein each meta die comprises a subset of the plurality of memory dies that can operate in parallel;
    means for determining a ratio of host writes to relocation operations to be performed in host and relocation blocks in one of the plurality of meta dies;
    means for determining, based on a state of the data storage device, whether closures of the host and relocation blocks can be aligned;
    means for performing the relocation operations in response to determining that the closures of the host and relocation blocks can be aligned; and
    means for delaying the relocation operations to align the closures of the host and relocation blocks in response to determining that the closures of the host and relocation blocks cannot be aligned.

* * * * *